June 13, 1939.　　L. ROBIN ET AL　　2,162,124
CHANGE-SPEED DEVICE
Filed Nov. 27, 1936　　7 Sheets-Sheet 5

Fig. 8

Inventors:
Leo Robin,
Mathieu van Roggen,
Attorneys

Fig. 12.

Inventors:
Léo Robin,
Mathieu van Roggen,
Attorneys

Patented June 13, 1939

2,162,124

UNITED STATES PATENT OFFICE 2,162,124

CHANGE-SPEED DEVICE

Leo Robin and Mathieu Van Roggen, Sprimont, Belgium

Application November 27, 1936, Serial No. 113,073
In Belgium December 14, 1935

11 Claims. (Cl. 74—119)

The present invention relates to change speed devices of the kind including the following elements: at least one driving connecting rod which, being pivoted to a crank turning with a continuous movement, operates a receiving connecting rod the movements of which are guided, for instance by a system including a guiding crank turning about a pivot, in such manner that said receiving connecting rod can impart to the receiving crank a reciprocating motion which drives the receiving shaft only in one direction of rotation, owing to the provision of a uni-directional drive, such a system being further deformable under certain conditions making it possible, for instance by modifications of the respective positions of the two shafts and of said pivot, to vary the ratio of the angular effective strokes of the two cranks.

The invention is more especially, although not exclusively, concerned with devices of this kind for use in connection with motor vehicles.

The object of the present invention is to provide a change speed device of this kind which is better adapted to meet the requirements of actual practice than other devices based upon the same principle used up to this time. A particular object of the invention is to increase the range of variation of the speeds and to maintain "homokineity", that is to say the constancy of the ratio of the angular movements of the two respective cranks, during a sufficiently long portion of the stroke of the driving crank.

An essential feature of the present invention consists in dimensioning the essential elements of the systems in question in such manner that it is possible to maintain homokineity during a portion of the angular stroke of the driving crank approximating 90°, and even greater, these conditions being most readily obtained if, in the case of the two connecting rods being pivoted to the guiding crank at the same distance from the pivot thereof, and supposing the radius of the driving crank to be equal to 1, the length of the guiding crank is given a value approximating 2, ranging for instance between 1.7 and 2.5, the mean distance between the axis of the driving shaft and the axis of the pivot of the guiding crank ranging between 3.5 and 5 and being preferably close to 4.3 when the length of the guiding crank is equal to 2.

According to another feature of the present invention, corresponding to devices in which the variation of the gear ratios is obtained by varying the position of the pivot of the guiding crank with respect to the two shafts, which remain at a fixed distance from each other, the path of movement of said pivot is determined in the following manner: It is assumed first, for the sake of clarity, that the pivot is stationary and the shafts movable, more especially with the driving shaft movable along a line passing through it and said pivot. Under these conditions we trace a series of curves determining a surface as wide as possible and representing the paths along which, for each value of the distance between the driving shaft and the pivot, it is possible to place the driven shaft while preserving homokineity, and, on the other hand, we determine, inside this area, for each value of said distance, the position of the driven shaft, which must remain at a fixed distance from the driving shaft, these operations being effected in such manner as to obtain, as locus of the positions of said driven shaft, a curve that cuts the curves of the series above mentioned at a certain angle and that is of substantial length, in such manner as to obtain the maximum of amplitude of the range of variation of the speeds. The path of displacement of the pivot, when this pivot is movable, whereas the shafts are stationary, is deduced from these operations and the whole is preferably such that this path is a circular arc.

A third feature of the invention consists in devising the system above described in such manner that, during the angular displacement of the driving crank through 180° that corresponds to the driving stroke, homokineity is preserved within a driving angle arranged nearly symmetrically with respect to the ends of this displacement of 180°.

Still another feature of the invention consists in arranging the system and choosing the direction of positive driving of the free wheel system to be interposed between the driven shaft and the receiving crank in such manner that driving takes place for the receiving shaft in the same direction as for the driving shaft and when the driving connecting rod is moving on the half-stroke thereof in which it intersects the line passing through the axis of the driving shaft and the axis of the pivot of the guiding crank.

Still another feature according to the invention consists in choosing, as ratio of length of the driving crank and length of the driving connecting rod, a value ranging between ⅓ and ⅕, and preferably ¼.

Still another feature of the invention consists in combining systems of the kind above mentioned with engines, especially vehicle engines, in such manner that the driving connecting rods of said systems are actuated directly by the crankshaft (or any member connected thereto inside the engine casing) in such manner that the whole of the crankshaft, the change speed device, and the mechanism for varying the gear ratio, may be housed inside said engine casing.

Finally, still another feature of the invention consists in combining with systems of the kind above referred to a reverse drive device interposed between the driving shaft and the receiving shaft and such that the receiving shaft can drive the driving shaft with a gear ratio which, preferably, does not exceed the inverse of the maximum gear ratio permitted by the change speed device, such an arrangement being particularly advantageous in the case of vehicles since it permits of avoiding the drawbacks of free wheel devices.

Other features of the present invention will result from the following detailed description of some specific embodiments thereof.

Preferred embodiments of the present invention will be hereinafter described, with reference to the accompanying drawings, given merely by way of example, and in which.

Figures 1, 13:
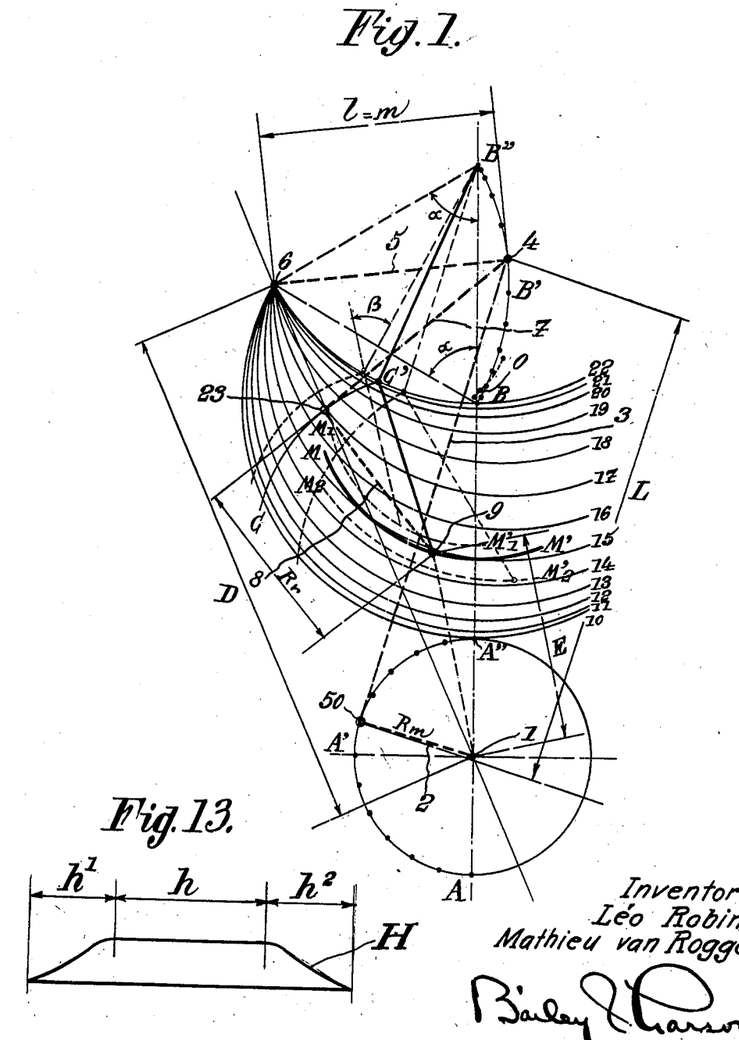
Figs. 1 to 3 inclusive are diagrams illustrating the operation of a change speed device according to the invention.
Fig. 13 is a curve showing the qualities of homokineity of devices according to the invention.

Referring first to Fig. 1, which diagrammatically shows the principle of a change speed device according to the invention, the driving and driven shafts are designated by reference numbers 1 and 9, respectively. The device essentially includes a driving crank 2, a driving connecting rod 3, a guiding crank 5 pivoted about a point 6, operated by said driving connecting rod and acting upon a receiving connecting rod 7, the latter cooperating with a receiving crank 8. This receiving crank 8 is coupled with the driven shaft 9 through a unidirectional drive device.

It has already been suggested, in systems of this kind, to give pivot 6 displacements intended to make it possible to vary the speed ratio, that is to say the ratio of the angular displacements of the two cranks.

But, when determining the proportions and the laws of displacement of the whole, account was not sufficiently taken of the data of the problem and solutions were obtained which are of little interest, especially in view of the fact that true homokineity is not obtained. Under these conditions, it was attempted, in order to obtain a continuous movement, to make use of a great number of elementary systems, each of which cooperates, on the receiving shaft, with a unidirectional drive system. Furthermore, homokineity was preserved only within very narrow limits of variation of the speed ratio, so that the range of variation of this ratio was itself limited.

The object of the invention is to provide a device of the kind above described which is made truly satisfactory from a practical point of view by obtaining true homokineity and also by widening the limits of variation of the ratio above mentioned within which said homokineity is maintained, while avoiding also, of course, the possibility for the connecting rods of assuming dangerous positions in which interference is possible.

To this effect, according to the present invention, we give the proportions of the various elements of the system values which are particularly advantageous for obtaining a wide range of homokineity.

Furthermore, the path of displacement of the pivot 6 of crank 5 is so determined that, considering first the case in which pivot 6 is stationary while axes 1 and 9 are both movable with respect thereto (a case which can correspond to an effective construction but which is chiefly interesting from the point of view of the facility of explanations), the following conditions are to be complied with:

a. To various values of distance D (from pivot 6 to driving shaft 1) taken, more particularly, all along a single line passing through pivot 6, there must correspond curves of homokineity, that is to say curves representing each the locus of the positions of the receiving shaft, or driven shaft, that can be accepted from the point of view of homokineity, which cover an area as large as possible.

b. On the other hand, account being taken of the fact that the distance E between axes 1 and 9 must remain constant, there must be determined, for each value of D, a position of axis 9 on the corresponding curve, so that the locus of these positions of axis 9 (corresponding to the various values of D) is a curve as long as possible, since the amplitude of the variations of the speed ratio depends upon the length of said curve.

These conditions make it possible to define the path of displacement of the pivot when both axes 1 and 9 are fixed, as will be hereinafter explained.

Concerning first the proportions above mentioned, we found that it is particularly advantageous to choose the following ones, which have been adopted on the drawings:

R$m$, radius of the driving crank 2, equal to 1;

L, length of the driving connecting rod 3, equal to 4;

$m$, radius or length of the guiding crank 5, equal to 2;

$l$, length of the receiving connecting rod 7, equal to 2;

R$r$, radius of the receiving crank 8, equal to 1.5;

D, distance between pivot 6 and the axis of the driving shaft, ranging between 4.1 and 4.7.

Of course, these indications have no limitative character, as will appear from what follows.

The following facts should already be noted:

The values of $m$ and $l$ are chosen equal to each other in order to permit the zero ratio of transmission, but they might be different from each other if this condition was not requested;

Radius $R_r$ depends upon the values chosen for the other elements and is, for a given embodiment, variable under certain conditions depending upon the necessity of maintaining homokineity and that of avoiding interference;

Concerning distance D, or rather its mean value (which would be 4.4 in the example above given) it is preferably dependent upon the values of L and $Rm$ in accordance with a geometrical relation which is visible in Fig. 1.

In this Fig. 1, we have diagrammatically shown a transmission in which the driving connecting rod 3 is connected at the same point 4 with the guiding crank 5 and the receiving connecting rod 7. For a revolution AA′A″ of crank 2 through 180°, there is produced a displacement BB′B″ of the guiding crank 5. In the drawings, arc AA′A″ is divided into twelve equal portions and the twelve corresponding portions have been marked upon arc BB′B″.

It will be seen that, according to the embodiment of Fig. 1 the extreme points B and B″ are in line with axis 1, that is to say the angles α made by the guiding crank 5 with the driving connecting rod are the same at both ends of the stroke and the distance BB″ is equal to 2Rm, which constitutes the above mentioned geometrical relation between L, Rm and D. But it should be noted that this relation is not absolutely necessary.

Concerning now the positions to be given to the various elements of such a transmission with a view to permitting the variation of the speed ratio under the conditions above set forth, we proceed, for instance, in the following manner:

First of all, the system is preferably arranged in such manner that the receiving crank 8 drives its shaft 9, through a free wheel device suitably arranged for this purpose, in the same direction of rotation CC′ as that of the driving shaft 1, the transmission further taking place when the driving connecting rod 3 is moving along the half stroke AA′A″ in the course of which it cuts line 6—1, said arrangement being the most advantageous for homokineity and thus make it possible to avoid dangerous dead center positions.

Now, being given a system such as that diagrammatically shown by Fig. 1, it is noted that the locus of the positions that can be occupied by the end 23 of the receiving connecting rod 7, that is to say its articulation with the receiving crank 8, consists of a series of circular arcs such as arcs 10, 11, 12, 13, 14, 15, 16, 17, 18, 19, 20, 21, and 22 passing all through pivot 6 (in the case of m being equal to 1) and having a radius equal to m.

For a given position of the receiving axis 9, such a series of curves makes it possible to determine, at its intersection with the circular arc CC′ passing through the end 23 of the receiving connecting rod, the positions of this end that correspond to those of the end 50 of the driving crank.

It is easy to determine, for a given value of Rr, a curve MM′ such that, if the axis of the receiving shaft 9 were displaced along said curve, the various arcs CC′ thus obtained would be, for an important portion of their length, divided into equal portions by the corresponding arcs of the series from 10 to 22. This curve can, as a rule, be considered as equivalent to a circular arc having its center at 0.

On such a curve MM′, one of the ends M, which is at a distance from pivot 6 equal to length $Rr$, corresponds to the zero speed ratio, axis 23 then coinciding with pivot 6. If, on the contrary, axis 9 is moved toward M′, the ratio increases. For instance, for the position of axis 9 shown in full lines in Fig. 1, an arc of 15° of crank 2 in the direction already mentioned gives, for connecting rod 3 an arc of 6°, this, of course, within the range of homokineity.

If now, without changing in any way the proportions of the other elements, which are supposed for instance to remain those above mentioned, distance D is varied by displacing the axis of the driving shaft 1, it is possible to trace a series of curves MM′ corresponding to these various positions.

Figures 2, 3:
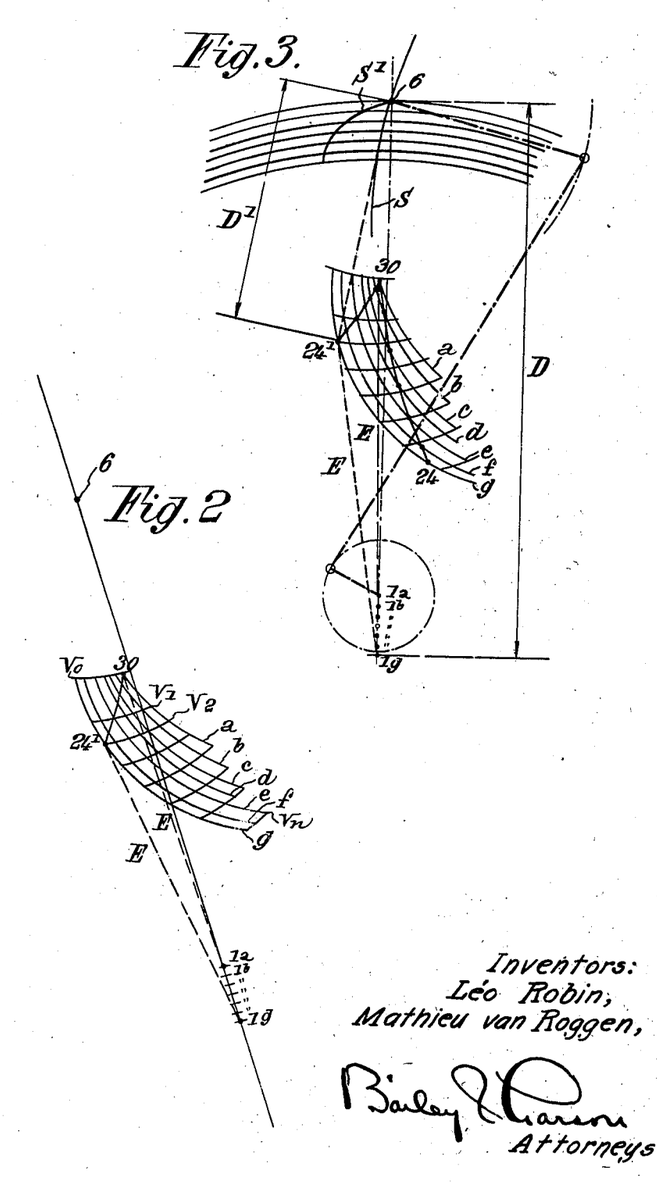

In Fig. 2 we have traced seven curves MM′, which are designated by reference characters a, b, c, d, e, f, g, corresponding with seven positions 1a, 1b, ... 1g of shaft 1. To these seven positions correspond for instance the variations of D above indicated, that is to say from 4.1 to 4.7.

On this diagram of Fig. 2 we may further trace contour lines such as $V_0, V_1, \ldots V_n$, corresponding respectively to various speed ratios, starting for instance from the zero value.

We will now start from this diagram for defining the respective positions of axes 1, 9 and 6, for the various ratios above mentioned, noting that the distance E between axes 1 and 9 must remain unchanged.

Under these conditions, since homokineity is to be obtained, it is already clear that it is possible to trace on the series of curves a, b, c, ... g a curve 24¹—30 which is the locus of the positions of axis 9 corresponding to those 1a, ... 1g of axis 1. This locus will be obtained by describing, from each of the points 1a, ... 1g as center, a circular arc having a radius equal to E and by tracing its intersection with the corresponding curve a, ..... g.

We thus define a law of variation of the distances D and D¹ from pivot 6 to axes 1 and 9 as a function of the speed ratio, this variation corresponding to said pivot remaining stationary and to the positions of axes 1 and 9 being varied while leaving them at a fixed distance from each other. It follows that, by a mere geometrical rabattement, for instance in the direction 1g—24¹, it would be possible to determine the path of displacement of axis 6, when shafts 1 and 9 remain stationary.

This path of travel (curve S¹ in Fig. 3) would correspond to a solution of the problem, but, as a rule, this solution is of little interest for practical purposes, for the following reasons:

First, this curve S¹ cannot be considered as an element of a circle, and it is desirable to give a circular path of displacement to pivot 6. Furthermore, as results from Figs. 2 and 3, curve 24¹—30 intersects only a small number of contour lines such as $V_0, V_1$, etc., since it intersects lines a, b, ... g at a large angle.

It is thus clear that, in order to obtain a solution giving practically interesting results, it is desirable that this curve 24¹—30 should intersect a large number of contour lines, which involves the following coinditions:

a. the area covered by homokineity curves a, b, ... g must be as large as possible for relatively small variations of D; this condition can be complied with by making use of the proportions of the elements above mentioned, or proportions little different therefrom;

b. the curve such as 24¹—30 must intersect lines a, b, ... g at a small angle, or, otherwise stated, it must intersect contour lines V₀, ... Vₙ at a large angle.

This last mentioned condition can be obtained in a simple manner by angularly displacing axis 1, either on the left or on the right hand side of the initial line of axes, such a displacement being performed in such manner as to change nothing, at least nothing substantial, in the effects produced by the guiding crank.

Figures 4, 10, 11:
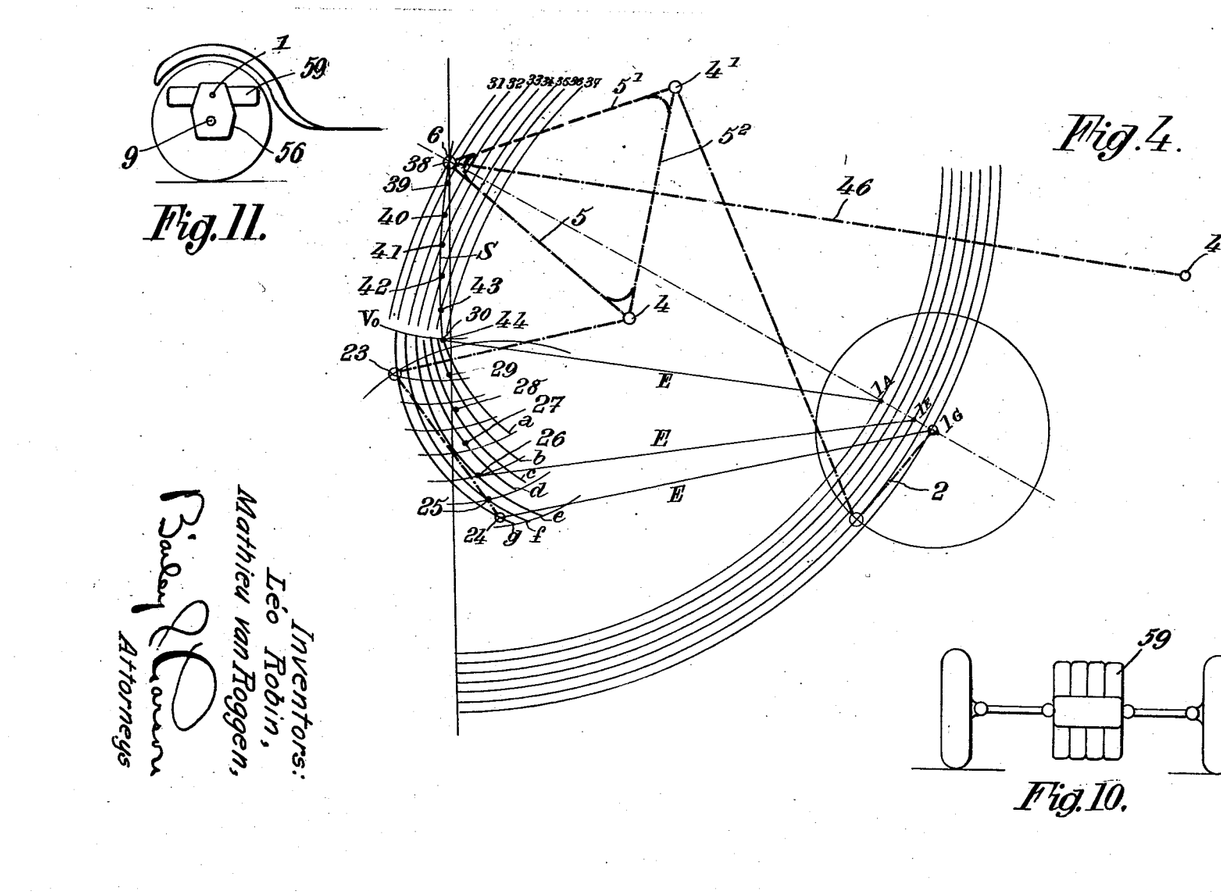
Figs. 4 and 5 are two diagrams of the same kind, corresponding to two preferred embodiments of the invention.
Fig. 10 is a diagrammatic plan view of an engine for a set of driving wheels of a vehicle made according to another embodiment of the present invention.
Fig. 11 is a side view corresponding to the view of Fig. 10.

If, for instance, according to an embodiment which seems to be particularly advantageous and which is shown in Fig. 4, axis 1 is displaced angularly, on the right hand side, through an angle of 60°, we obtain, for this axis, new positions 1A, ... 1G, and the relative movements of the various elements are not modified if the point of action 4 of the guiding crank is also angularly displaced through the same angle, said point becoming 4¹, and being for instance connected with axis 6 and guiding crank 5 through connections 5¹ (of the same length as said crank) and 5².

It is then possible to make the same graphic construction as above, which gives a new curve 24, 25, 26, ... 30 of the various positions of axis 9. It is apparent that this new curve, which is supposed to start from point 30 corresponding to a speed ratio equal to zero, intersects a great number of contour lines. For instance, at point 24, the ratio of the angular speeds may be close to ½.

Starting from this new curve, we obtain the path of displacement of the pivot 6 by rabatting all the axis lines on, for instance line 24—1G. It is sufficient, for this purpose, considering any line 26—1E, to describe, with point 1G as center, a circular arc of a radius equal to 6—1E, and then, with point 24 as center, a circular arc of a radius equal to 6—26. The intersection of the two arcs gives a point 40 of the curve S to be obtained.

It is therefore easy to trace the points 38 to 44 of this curve, on circular arcs 31 to 36 and it is found that said curve can be considered as equivalent to a circle the center of which is at 45 and the radius of which is relatively small, the modification of the speed ratio being, for instance, obtained through the pivoting of a lever 46 of moderate length. This lever 46 may be moved manually by any suitable means.

With the arrangements above described, it is possible to obtain a change speed device which complies to all the conditions above set forth, that is to say: a very wide range of speed ratios (from zero to ½ and even more), with homokineity for the whole of this range corresponding to a large portion of the stroke of the driving crank (this stroke approximating 90° or being even greater than 90°) whereby it would be sufficient to associate only four devices of the kind of that above described with four driving cranks making respective angles of 90° with one another for obtaining a perfectly uniform driving torque, the whole system occupying but relatively little space, since, for instance, the length of the control lever 46 is relatively small.

It should further be noted, and this is another important feature of the invention, that curve H (Fig. 13) which represents the law of variation of the angular stroke of the receiving crank with respect to that of the driving crank, considered along arc AA'A" (Fig. 1), which curve therefore includes a level portion h¹ corresponding to the amplitude of the homokineity curve, is substantially symmetrical with reference to its ends, if the proportions above indicated in the description are adopted.

Owing to this last feature it is possible to cause the accelerations and decelerations imparted to receiving elements 7 and 8 during the extreme portions of the stroke, represented by parts h¹ and h² of curve H, to remain within reasonable limits.

We will now indicate some variations of the proportions of the various elements, it being well understood that proportions other than those above indicated (which are believed to be the best ones) would remain within the principle of the invention provided that at least one of the above stated conditions is complied with, that is to say at least one of the following conditions:

a. Insurance that the homokineity portion of the stroke, taken on the driving shaft, is close to 90°, even greater than 90°;

b. Provision of a wide range of speed ratios, complying with homokineity within the whole of its amplitude and having, for instance, a maximum value, approximating ½ or greater than ½, the curve S of pivot 6 being, furthermore, preferably, a circular arc of moderate radius, for instance ranging within 5 and 6 for the proportions above indicated (and which may, besides, be greatly reduced owing to the proportional reduction which will be hereinafter mentioned);

c. Provision, for the curve of angular velocity of the two driving and receiving cranks, of a symmetrical shape.

Concerning first the radius $Rr$ of the receiving crank, it is apparent in Fig. 1 that, for a predetermined solution chosen for $m$, $L$, $Rm$ and $D$, it is possible to choose for this radius $Rr$ various values, three of which have been shown on said figure, with the corresponding homokineity curves at MM', M₁M'₁, M₂M'₂.

It seems that, in the example given, $Rr$ might vary between 1.3 and 1.9.

Concerning now the other values, $m$, $L$, $Rm$ and $D$, the following facts can be noted:

Supposing $m$ and $Rm$ to be constant, it is possible to vary within certain limits the ratio $$\frac{Rm}{L}$$

for instance between ⅓ and ⅕ and, consequently, the mean value of D, for instance, between 3.5 and 5.5. But it is found that, on the one hand for low values of this ratio (lower than ¼) the driving connecting rod is subjected to the well known disadvantages of short connecting rods, and, on the other hand, for high values of this ratio (higher than ¼) angles β become dangerous.

However, it seems that suitable results are obtained for values of said ratio ranging between $$\frac{1}{3.7} \text{ and } \frac{1}{4.2}$$

the mean value of D being deduced from this. Besides, for high proportions, it is possible to correct the homokineity curves by reducing the radius $m$ of the guiding crank, for instance with the ratio $$\frac{1}{1.9}$$

being still the radius $Rm$, or by increasing this radius $Rm$.

As for the ratio of these two radii $m$ and $Rm$, it seems that it is possible to vary them independently only within rather narrow limits.

This results from the fact that, if, without changing $m$ or $D$, we increase the value of $Rm$, we are led to increase in an exaggerated manner the value of $Rr$, and furthermore dangerous dead center positions may occur. On the other hand, curves H are no longer symmetrical.

We obtain analogous results by leaving $Rm$ constant and varying $m$. For instance, an increase of the length of $m$ reduces the radius $Rr$ of the receiving crank, which, in many cases, is an unacceptable drawback.

We will now show that, according to another feature of the invention, it is possible to proportionally reduce lengths L, $Rm$ and D.

Figures 5, 6, 7:
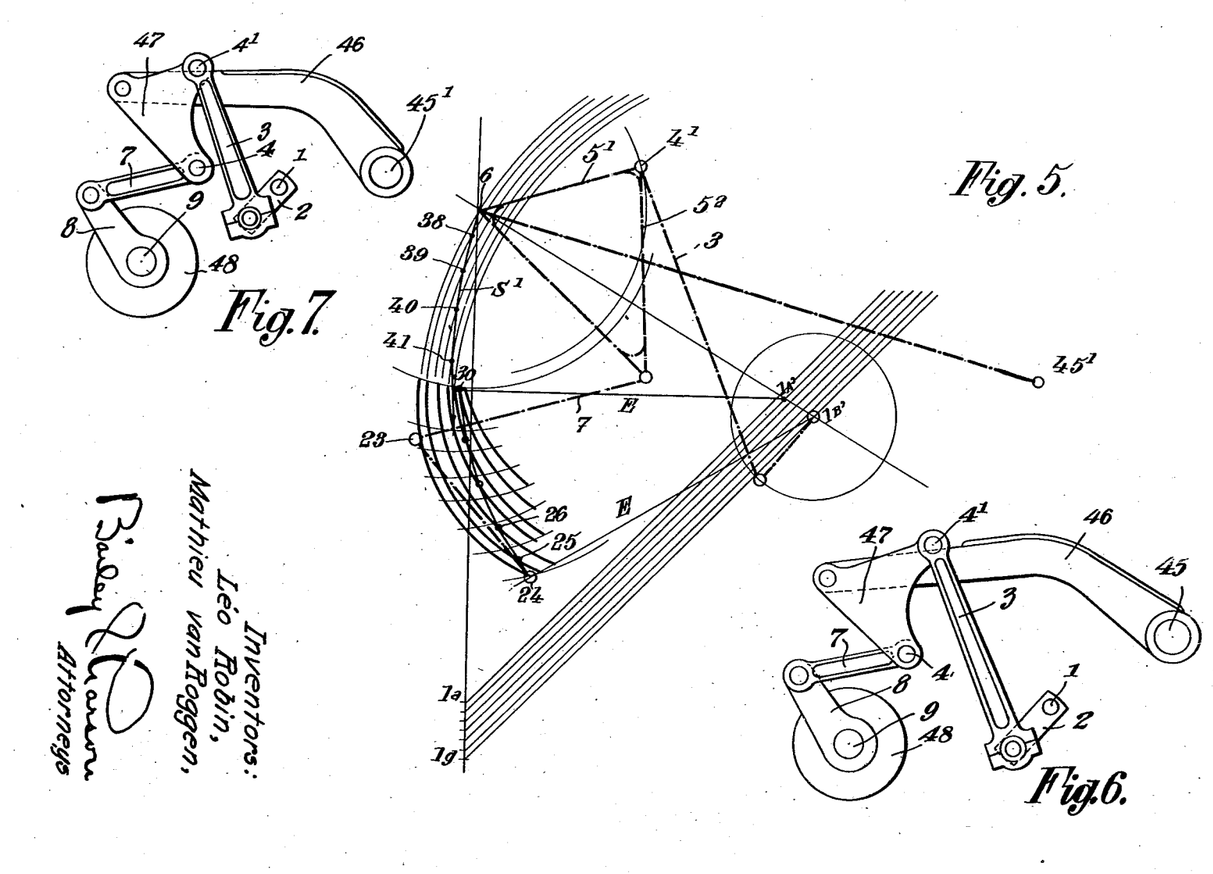
Figs. 6 and 7 show, in elevational view, the essential elements of a system of this kind made according to the principle illustrated by Figs. 4 and 5.

It suffices, for this purpose, starting for instance from the solution shown in Fig. 5, to define new positions 1A, ... 1G corresponding to new values of D and to act upon the guiding crank at a distance 6—4¹ reduced in the same proportion.

In this case, nothing is changed in the conditions under which the guiding crank is driven by the driving connecting rod 3. But by making the same graphic constructions as above, we obtain a new curve 24—30 and consequently a new curve $S^2$ for the displacement of point 6. This curve $S^2$ has itself a radius 6—45¹ lower than that of the initial solution so that, finally, the whole occupies a more restricted space.

This reduction may be made as considerable as it is desired, within the limits imposed by the conditions of mechanical resistance. We may, for instance, choose a reduction ratio equal to $$\frac{1}{1.4}$$

as shown in Fig. 5. We might consider a more important reduction, but this might involve, in some cases, too important stresses on the primary members (2, 3 and 5¹).

In Figs. 6 and 7, we have shown two embodiments corresponding, respectively, to the diagrams of Figs. 4 and 5. The connection between the axes of articulation 4, 4¹ and pivot 6 is obtained through a bell crank lever 47.

Figure 8:
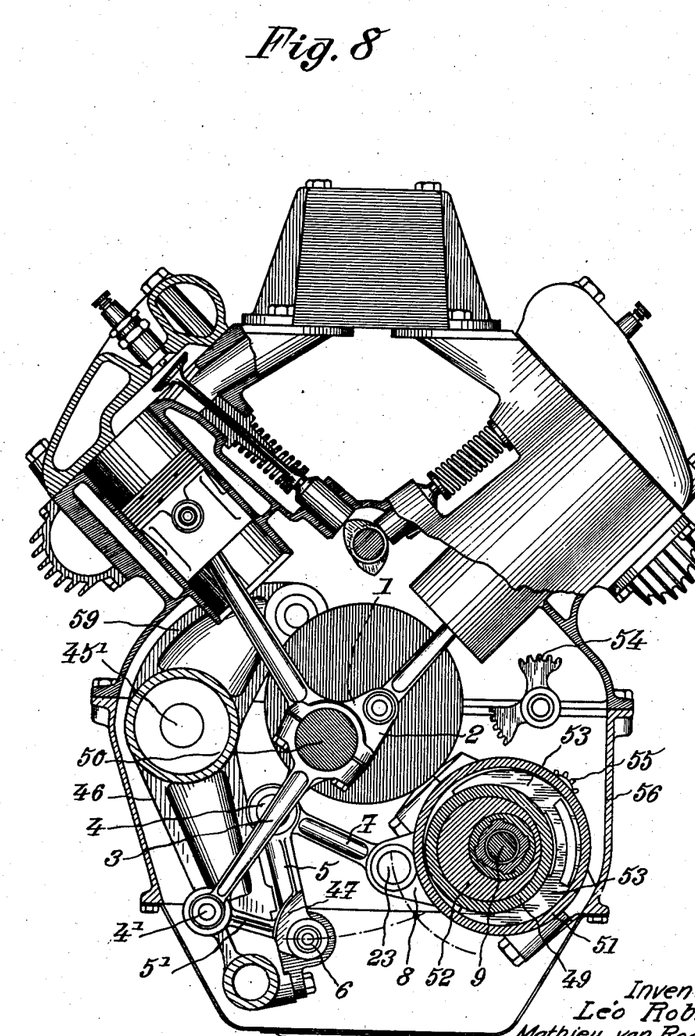
Fig. 8 is a sectional view, with parts cut away, of an engine combined with a change speed device according to the invention, the whole being, together with the reverse drive system, made according to the present invention.

Reference number 48 designates a free wheel device which may be made in many different ways, although it is believed advantageous to make use of a device described in our application filed November 27, 1936, S. N. 110,527, which device essentially includes, as shown by Fig. 8, two members 49, 51, capable of rolling upon each other, under the action, for instance, of an eccentric 52 connected to crank 8, but only in one direction, corresponding to free-wheel running, whereas, in the other direction, there is interposed, between these two members, an obstacle 53, constituted, for instance, by a kind of key or wedge, a positive drive being then obtained.

We may further combine with a change speed device of this kind, a reversing gear, which may be made in many different ways, but which is preferably devised in such manner as to reverse the direction of drive of the free-wheel device. For this reason, it will be advantageous, in this case also, to make use of the arrangements set forth in the application above mentioned, which provides, for this purpose, two keys or wedges 53, adapted to be used, for both directions of operation, respectively, under the action of a reversing control device such as 54—55.

The applications of change speed devices according to the present invention may be of many various kinds. In the particularly advantageous application to motor vehicles, we make use, preferably, of the following arrangements, which, in fact, can be employed separately, that is to say in combination with any change speed device of the type considered, even if said change speed device is not based upon the principle above mentioned.

According to one of these arrangements, we combine with the engine the change speed devices in question in such manner that the driving shaft 1 above referred to is the crankshaft of said engine or consists of a shaft directly associated with the crankshaft inside the casing, whereby the whole of the crankshaft and the change speed device can be enclosed inside said casing 56, (Figs. 8 to 11) such an arrangement being very advantageous since it leads to a very small space being occupied by the device and to an easy lubrication.

Of course, we may combine in different manners a system of this kind, and various features may be employed (either in the case of a front engine or in the case of a rear engine), by way of example, when homokineity is obtained over 90°.

Figure 9:
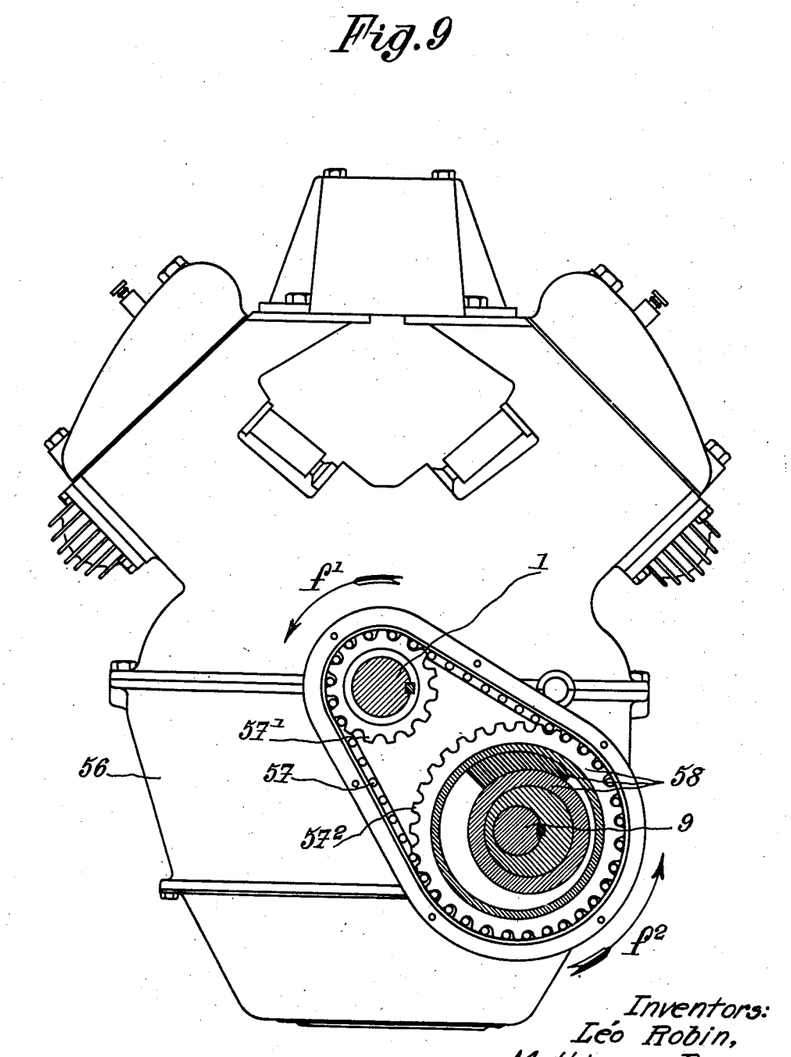
Fig. 9 is an elevational view partly in section corresponding to Fig. 8.

Case of a eight cylinder V engine (Figs. 8 and 9). Each crank pin 2 carries the connecting rods of two cylinders and the connecting rod of a transmission group;

Case of an engine with opposed cylinders, 59, as shown in Figs. 10 and 11. This solution seems to occupy a very restricted space and makes it possible to combine shaft 9 with the shaft actuating the driving wheels or to make it parallel thereto.

In a general manner, any machine including a crankshaft would be suitable, provided that said crankshaft has four crank pins at 90° to one another, in the example above described.

It may be noted that, because of the arrangement of the whole, no space is lost in the casing, since axes 6 and 9 may be arranged even nearly symmetrically with reference to the crankshaft 1, as visible in Fig. 8.

If gear wheels are interposed between shaft 9 and that actuating the differential gear, said wheels may also be housed inside the casing.

Figure 12:
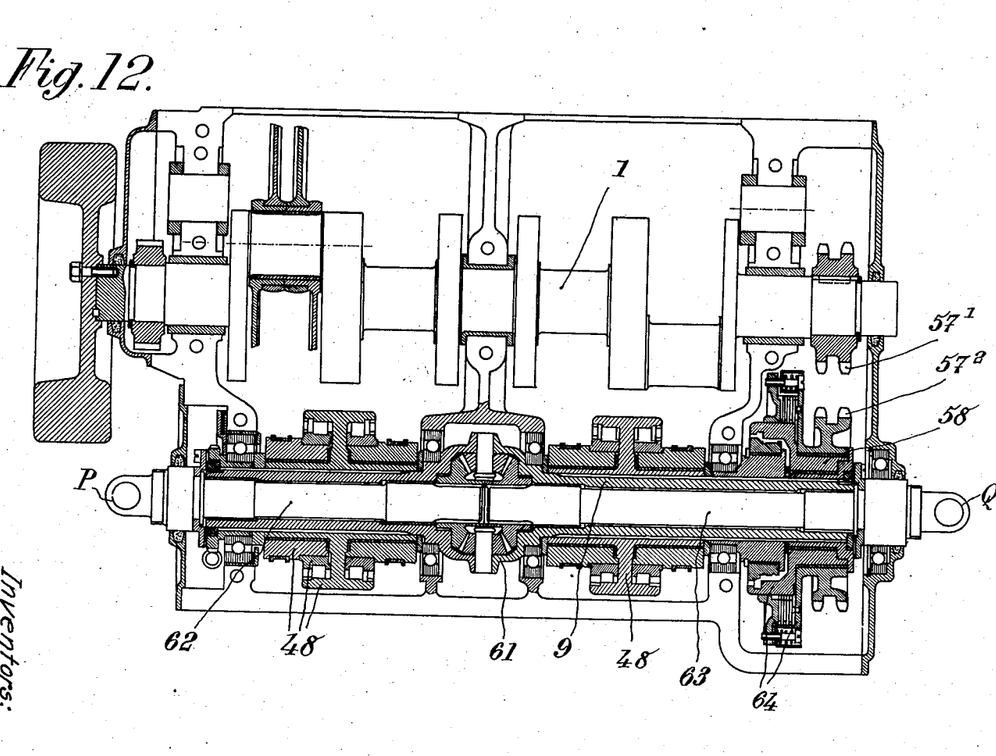
Fig. 12 shows a system of the same kind made according to another embodiment.

In Fig. 12, we have shown the combination, inside a casing, of an engine, a change speed device according to the invention (some parts of which have been removed in the drawings) and a differential gear, this group being, for instance, intended for front drive (although the arrangements hereinafter described might also be applied to a power plant for rear drive).

The driving shaft 1 advantageously has a transversely disposed axis, and shaft 9, the axis of which is parallel to the preceding one and which may be arranged either at the front or, preferably, at the rear of the engine, may itself constitute the casing 61 of the differential gear.

Said shaft 9 is hollow, in such manner as to contain the two shaft elements 62, 63 at the ends of which (at P and Q) are disposed the Cardan joints transmitting the movement of the wheels.

The movement is transmitted from crankshaft 1 to shaft 9 through the devices above mentioned and free-wheel devices 48 mounted on shaft 9.

We thus obtain a system which is much more compact and shorter than the usual engine-transmission group. We might, of course, by means of a similar unit, obtain a four-wheel drive, the rear wheels being operated through a bevel wheel transmission.

But we might also, by means of a group such as that shown in Fig. 12, but with a longitudinal axis, act, at P and Q, respectively, upon a front axle casing or a rear axle casing.

Another solution, which seems to be applicable, especially, to heavy-weight vehicles, consists in making use of the device of Fig. 12, which has a transverse axis, but in arranging shaft 62 and its differential gear behind shaft 9, in such manner as to be able to transfer the weight of the engine and its accessory elements ahead of the front axle and thus to increase the adhesion and also the useful capacity of the vehicle.

Finally, concerning the means for angularly displacing control lever 6 (which means act upon said lever or an arm 59 rigid therewith, or the pivot 6 through any suitable member), they can be made in many different manners and may be of any suitable type and being preferably adapted to work in the following manner:

a. Either in relation with functional factors of the engine, especially as a function of the speed of the engine and of the power required therefrom and in this case we preferably make use of the arrangements described in our application filed November 27, 1936 S. N. 113,074. These arrangements concern a control, and more especially a hydraulic control, positively subjected to the action of the throttle pedal or other organ controlling the load of the engine;

b. Or under the action of a manual control independent of said throttle or the like;

c. Or again under the effect of both of these controls, combined together, or at will under the effect of either of them.

According to still another feature of the invention, we combine with systems of the kind in question, a reverse drive device capable of avoiding that, for instance, in the case of the application to a motor vehicle, said vehicle can run under the effect of its acquired speed, in full free wheel.

Such a device is made in such manner that, if it is to permit of the driving shaft being driven by the receiving shaft, with a constant ratio, this ratio $$\frac{\text{Speed of driving shaft}}{\text{Speed of receiving shaft}}$$

does not exced the inverse of the maximum of the driving speed ratio, to wit, $$\frac{\text{Speed of driven shaft}}{\text{Speed of driving shaft}}$$

By way of example, if it is assumed that the maximum of the driving speed ratio is ½ (the receiving shaft 9 turning at a speed which is one half of the speed of shaft 1), the reverse drive device will give a ratio equal to 2, or, for the sake of safety that is to say avoid any opposition of action between this device and the change speed device, a ratio equal to $$\frac{1.9.}{1}$$

This reverse drive device may be made in various manners and it will essentially include, for instance, the following elements:

a. On the one hand a kinematic connection between shafts 1 and 9, this connection giving the above mentioned ratio (for instance 2 as shown) and consisting for instance of gear wheels, chains 57 and pinions 57¹ and 57² (Fig. 9) and so on.

b. And on the other hand, a free wheel 58, coacting with this connection and mounted either on axis 9 as shown or on axis 1.

It will be seen that, under these conditions, the vehicle running under the effect of its acquired velocity and the throttle pedal being in its upper position, the motive speed will decrease until it becomes equal to twice that of receiving shaft 9 and from this time on the engine will be constantly driven with the same ratio by said shaft, excepting, of course, the case in which the maximum drive ratio ½ was already obtained when the throttle pedal was released.

In Fig. 9, the arrows $f^1$ and $f^2$ correspond to the direction of driving and it is seen that free wheel device 58 is made in such manner that shaft 1 can turn freely in direction $f^1$. On the contrary, when the vehicle is running, said shaft can be driven also in this direction by chain 57.

But there is nothing to prevent the reverse-drive ratio being higher provided that means are provided for avoiding any mistake.

In a general manner, any torque limiting means may be employed for avoiding this danger, said means being such as a friction clutch 64 (Fig. 12).

It should be well understood that, in the following claims, the expression "curve of homokineity" corresponds to the following definition (referring to Figs. 6 and 7).

The axis 1 of the driving crank 2 being fixed and the pivot 6 of lever 7 being movable with respect to said axis 1, so that the distance from 6 to 1 varies with the position of 6 with respect to 1, for each distance from 6 to 1, there exists a curve such that, if the axis 9 of the driven crank 8 is located on said curve, homokinetic transmission is ensured. This curve is the "curve of homokineity" above mentioned.

While we have, in the above description, disclosed what we deem to be practical and efficient embodiments of the present invention, it should be well understood that we do not wish to be limited thereto as there might be changes made in the arrangement, disposition, and form of the parts without departing from the principle of the present invention as comprehended within the scope of the appended claims. The term "homokineity" means the condition of homokineitic transmission of motion, or, in other words, transmission of motion from a driving member to a driven member under such conditions that during any short interval of time the movement of the driven member will be equal to the movement of the driving member.

What we claim is:

1. A change speed device of the continuously variable transmission type, which comprises, in combination, a frame, eccentric driving means journalled in said frame to turn about a fixed axis, a driving connecting rod pivoted to said driving means, a driven eccentric means journalled in said frame to turn about a fixed axis, a driven connecting rod pivoted to said driven means, a pivot movably mounted in said frame so that its distance from the axis of said driving and driven means varies according to its position, a lever oscillatable about said pivot and interconnecting said connecting rods, the path of displacement of said pivot with respect to the axes of said driving and driven means being such that the curves of homokineity corresponding to the various positions of said pivot with respect to said first axis all pass through the axis of revolution of said driven eccentric means, a driven shaft journalled to turn about a fixed axis, and one-way coupling means between said driven eccentric means and said driven shaft.

2. A change speed device of the continuously variable transmission type, which comprises, in combination, a frame, a driving crank journalled in said frame about a fixed axis, a driv-